United States Patent
Akiyama (10) Patent No.: US 11,313,761 B2
(45) Date of Patent: Apr. 26, 2022

(54) TEST SYSTEM (71) Applicant: MEIDENSHA CORPORATION, Tokyo (JP)

(72) Inventor: Takao Akiyama, Tokyo (JP)

(73) Assignee: MEDENSHA CORPORATION, Tokyo (JP)

( * ) Notice: Subject to any disclaimer, the term of this patent is extended or adjusted under 35 U.S.C. 154(b) by 64 days.

(21) Appl. No.: 16/096,548

(22) PCT Filed: Apr. 25, 2017

(86) PCT No.: PCT/JP2017/016422
§ 371 (c)(1),
(2) Date: Oct. 25, 2018

(87) PCT Pub. No.: WO2017/188271
PCT Pub. Date: Nov. 2, 2017

(65) Prior Publication Data
US 2019/0137361 A1 May 9, 2019

(30) Foreign Application Priority Data

Apr. 28, 2016 (JP) .............................. JP2016-091313

(51) Int. Cl.
*G01M 15/02* (2006.01)
*G01M 15/00* (2006.01)
(Continued)

(52) U.S. Cl.
CPC .......... *G01M 15/02* (2013.01); *G01M 13/025* (2013.01); *G01M 15/00* (2013.01);
(Continued)

(58) Field of Classification Search
None
See application file for complete search history.

(56) References Cited

U.S. PATENT DOCUMENTS 4,939,985 A * 7/1990 Von Thun ........... G01M 13/025
73/115.01
5,410,228 A * 4/1995 Shibata ................... H02P 23/16
318/432
(Continued)

FOREIGN PATENT DOCUMENTS

CN 104035339 9/2014
JP H04-275086 9/1992
(Continued)

OTHER PUBLICATIONS

Wikipedia entry on Frequency compensation (https://en.wikipedia.org/wiki/Frequency_compensation) (snapshot taken of Apr. 14, 2016 entry using Wayback Machine—https://web.archive.org/web/20160414075933/https://en.wikipedia.org/wiki/Frequency_compensation) (Year: 2016).*

(Continued)

*Primary Examiner* — Arleen M Vazquez
*Assistant Examiner* — Leonard S Liang
(74) *Attorney, Agent, or Firm* — Muncy, Geissler, Olds & Lowe, P.C.

(57) ABSTRACT

The purpose of the present invention is to provide a device for controlling a dynamometer of a test system, wherein the device is capable of controlling shaft torque to a prescribed target torque while minimizing low-frequency-range resonance caused by viscous drag of a test piece. This test system is provided with a dynamometer joined to an engine via a coupling shaft, an inverter for supplying electric power to the dynamometer, a shaft torque meter for detecting the shaft torque produced in the coupling shaft, and a dynamometer-controlling device 6 for generating a torque-current command signal T2 that is sent to the inverter and is generated on the basis of a shaft torque detection signal T12 from the shaft torque meter. The dynamometer-controlling device 6 is provided with an integrator 62 for integrating the difference (Continued)

between the shaft torque detection signal 12 and a shaft torque command signal T12ref, and a phase lead compensator 63 for accepting an output signal from the integrator 62 as an input and performing a phase lead compensation process that uses constants (a1, b1) that are dependent on the viscous drag of the test piece. An output signal from the phase lead compensator 63 is used to generate the torque-current command signal T2.

4 Claims, 10 Drawing Sheets

(51) Int. Cl.
| | | |
|---|---|---|
| *G01M 15/04* | (2006.01) | |
| *G01M 13/025* | (2019.01) | |
| *G01M 15/12* | (2006.01) | |
| *G01L 3/16* | (2006.01) | |
| *G01M 13/02* | (2019.01) | |
| *G01L 3/22* | (2006.01) | |
| *G01L 3/24* | (2006.01) | |
| *G01M 17/007* | (2006.01) | |

(52) U.S. Cl.
CPC ............. *G01M 15/04* (2013.01); *G01L 3/16* (2013.01); *G01L 3/22* (2013.01); *G01L 3/24* (2013.01); *G01M 13/02* (2013.01); *G01M 15/042* (2013.01); *G01M 15/044* (2013.01); *G01M 15/12* (2013.01); *G01M 17/007* (2013.01)

(56) References Cited

U.S. PATENT DOCUMENTS

| | | | | |
|---|---|---|---|---|
| 5,521,824 | A * | 5/1996 | Eagan | G01M 15/044 700/282 |
| 5,729,111 | A * | 3/1998 | Ogura | G05D 19/02 318/623 |
| 5,990,645 | A * | 11/1999 | Nakamura | G01H 1/003 318/432 |
| 5,992,383 | A * | 11/1999 | Scholten | F02D 11/10 123/399 |
| 6,089,082 | A * | 7/2000 | Kotwicki | F02D 41/067 701/103 |
| 6,434,454 | B1 * | 8/2002 | Suzuki | G01M 15/02 701/32.9 |
| 6,498,451 | B1 * | 12/2002 | Boules | B62D 5/0403 318/400.06 |
| 6,566,837 | B1 * | 5/2003 | Zhang | G05B 19/19 318/610 |
| 2001/0048283 | A1 * | 12/2001 | Kaitani | H02P 6/18 318/700 |
| 2002/0091471 | A1 * | 7/2002 | Suzuki | G01M 15/02 701/32.9 |
| 2003/0094917 | A1 * | 5/2003 | Garrigan | H02P 9/305 318/700 |
| 2003/0163296 | A1 * | 8/2003 | Richards | G06F 17/5036 703/14 |
| 2005/0065690 | A1 * | 3/2005 | Ashizawa | F02D 29/02 701/51 |
| 2006/0070457 | A1 * | 4/2006 | De Lair | G01M 13/025 73/847 |
| 2009/0021208 | A1 * | 1/2009 | Romenesko | H02P 21/16 318/807 |
| 2009/0251092 | A1 * | 10/2009 | Zhang | G05B 11/42 318/609 |
| 2010/0082220 | A1 * | 4/2010 | Whitney | F02D 11/105 701/102 |
| 2010/0218738 | A1 * | 9/2010 | Ai | F01L 1/02 123/90.17 |
| 2010/0251811 | A1 | 10/2010 | Akiyama et al. | |
| 2012/0073276 | A1 * | 3/2012 | Meisner | H01L 35/30 60/320 |
| 2012/0160022 | A1 * | 6/2012 | Kimura | F02D 41/1441 73/114.72 |
| 2012/0239198 | A1 * | 9/2012 | Orita | B25J 9/1641 700/260 |
| 2013/0103238 | A1 * | 4/2013 | Yu | B60W 20/12 701/22 |
| 2013/0201316 | A1 * | 8/2013 | Binder | H04L 67/12 348/77 |
| 2014/0019081 | A1 | 1/2014 | Suzuki et al. | |
| 2015/0008861 | A1 * | 1/2015 | Sonoda | G05B 13/04 318/504 |
| 2015/0039246 | A1 * | 2/2015 | Takahashi | G01L 3/10 702/41 |
| 2015/0048772 | A1 * | 2/2015 | Nagata | G05B 6/02 318/634 |
| 2015/0081110 | A1 * | 3/2015 | Houston | G05D 19/02 700/280 |
| 2015/0219510 | A1 * | 8/2015 | Takahashi | G01L 3/22 702/41 |
| 2018/0031447 | A1 * | 2/2018 | Sugita | G01M 15/02 |
| 2018/0031448 | A1 * | 2/2018 | Sugita | G01M 15/042 |
| 2018/0052078 | A1 * | 2/2018 | Newberger | G01M 15/05 |
| 2018/0274473 | A1 * | 9/2018 | Levijoki | F01L 1/34 |
| 2018/0328815 | A1 * | 11/2018 | Akiyama | G01M 15/044 |

FOREIGN PATENT DOCUMENTS

| | | | |
|---|---|---|---|
| JP | H08-219953 | 8/1996 | |
| JP | 2002-365169 | 12/2002 | |
| JP | 2009-133714 | 6/2009 | |
| JP | 2010071772 A * | 4/2010 | |
| JP | 2010-223861 | 10/2010 | |
| JP | 2011-075514 | 4/2011 | |
| JP | 2013015386 A * | 1/2013 | |
| WO | WO-2010004870 A1 * | 1/2010 | ............ G01M 15/02 |
| WO | WO2012/124684 | 9/2012 | |

OTHER PUBLICATIONS

Zhao, Shen and Gao, Zhiqiang, "An Active Disturbance Rejection Based Approach to Vibration Suppression in Two-Inertia Systems" (2013), Electrical Engineering & Computer Science Faculty Publications, 438. https://engagedscholarship.csuohio.edu/enece_facpub/438. (Year: 2013).*
Machine Translation for JP2010071772A (Year: 2010).*
Machine Translation for JP2013015386A (Year: 2013).*
Machine Translation for WO2010004870A1 (Year: 2010).*

* cited by examiner

TEST SYSTEM

TECHNICAL FIELD

The present invention relates to a device for controlling a dynamometer of a test system. More specifically, the present invention relates to a dynamometer control device for a test system which generates a torque current command signal for an inverter based on a shaft torque detection signal.

BACKGROUND ART

Figure 10:
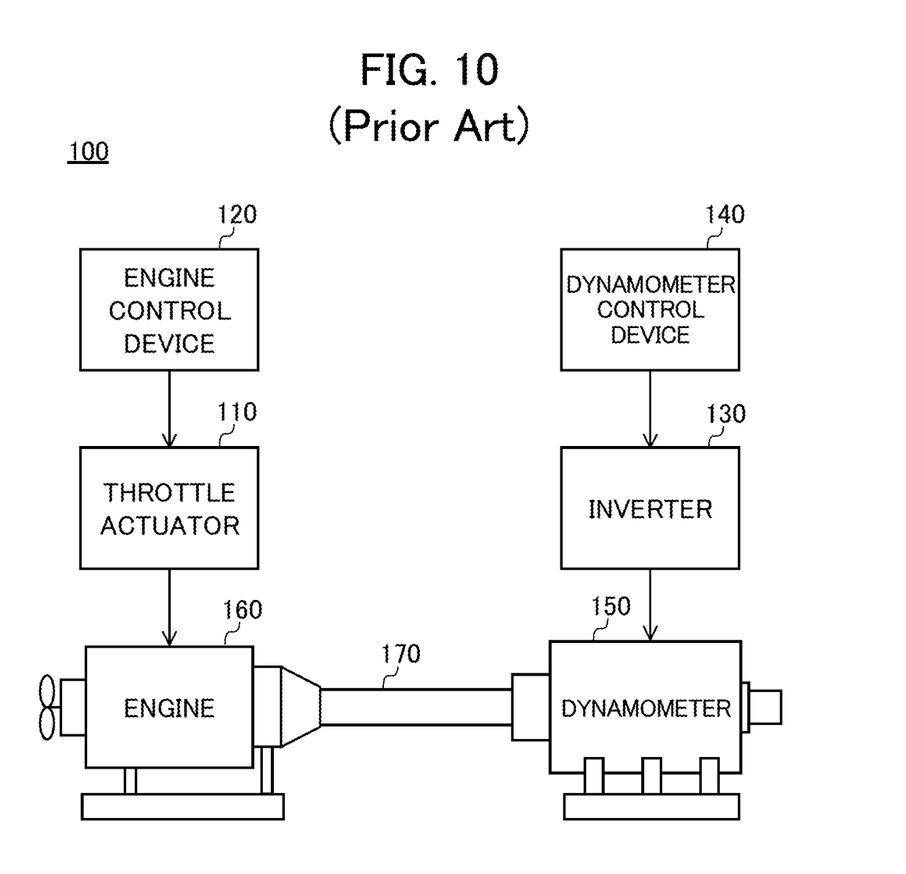
FIG. 10 is a diagram showing the configuration of the conventional test system.

FIG. 10 is a diagram showing the configuration of a test system 100 of an engine 160 which uses a dynamometer 150. The test system 100 includes: the dynamometer 150 which is coupled with a coupling shaft 170 to the engine 160 serving as a test piece; a throttle actuator 110 and an engine control device 120 which control an output of the engine 160; and an inverter 130 and a dynamometer control device 140 which control an output of the dynamometer 150. In the test system 100, while the throttle opening of the engine 160 is being controlled with the engine control device 120, the dynamometer control device 140 is used to control the torque and the speed of the dynamometer 150, power generated in the engine 160 is absorbed in the dynamometer 150 and thus the durability, the fuel consumption, the exhaust purification performance and the like of the engine 160 are evaluated.

Incidentally, in the test system configured with a mechanical system in which the engine 160 and the dynamometer 150 are coupled with the coupling shaft 170 as described above, a resonance phenomenon may occur due to a torque ripple produced in the engine 160. Patent document 1 discloses a dynamometer control device which controls a shaft torque to a predetermined target while reducing the mechanical resonance as described above.

Patent Document 1: Japanese Unexamined Patent Application, Publication No. 2009-133714

DISCLOSURE OF THE INVENTION

Problems to be Solved by the Invention

The dynamometer control device of patent document 1 is introduced such that an equation of motion in which the mechanical system described above is modeled is used to obtain an effect of reducing the resonance of a resonance frequency of about several tens of Hz. However, in patent document 1, the viscous drag of an engine is not considered. Hence, when the dynamometer control device disclosed in patent document 1 is applied to an engine in which the influence of the viscous drag of the engine remarkably appears and which is controlled in a low revolution range (specifically, for example, the idle speed), the control of the engine speed by the engine control device and the control of the shaft torque by the dynamometer control device interfere with each other, with the result that in a low frequency region of about 0.5 Hz lower than the mechanical resonance frequency, a resonance phenomenon may occur in the engine speed and the shaft torque. Hence, it may be difficult to perform a highly accurate measurement in a region in which the engine speed is low.

An object of the present invention is to provide a dynamometer control device for a test system which can control a shaft torque to a predetermined target shaft torque while reducing resonance in a low frequency region caused by the viscous drag of a test piece.

Means for Solving the Problems (1) A test system (for example, a test system 1 which will be described later) includes a dynamometer (for example, a dynamometer D which will be described later) which is jointed to a test piece (for example, an engine E which will be described later) for generating torque through a coupling shaft (for example, a coupling shaft S which will be described later), an inverter (for example, an inverter 3 which will be described later) which supplies electric power to the dynamometer and a shaft torque meter (for example, a shaft torque meter 7 which will be described later) which detects a shaft torque produced in the coupling shaft and a dynamometer control device (for example, a dynamometer control device 6 which will be described later) which generates a torque current command signal (T2) for the inverter based on a shaft torque detection signal (T12) of the shaft torque meter. The dynamometer control device includes: an integrator (for example, a integrator 62 to be described later) which integrates a difference between the shaft torque detection signal and a command signal for the shaft torque; and a phase lead compensator (for example, a phase lead compensator 63 to be described later) which uses an output signal of the integrator as an input and which performs phase lead compensation processing using one or more constants (for example, constants (a1, b1) to be described later) that depend on the viscous drag of the test piece and generates the torque current command signal using an output signal of the phase lead compensator.

(2) Preferably, in this case, a transfer function G1(s) of the phase lead compensator is represented by formula (1) below by use of two constants (a1, b1) which depend on the value of a viscous drag coefficient (C1) of the test piece, the value of moment of inertia (J1) of the test piece and the value of moment of inertia (J2) of the dynamometer;

$$G1(s) = \frac{b1 \cdot s + 1}{a1 \cdot s + 1} \quad (1)$$

where b1>a1.

(3) Preferably, in this case, when the viscous drag coefficient is C1, the moment of inertia of the test piece is J1, the moment of inertia of the dynamometer is J2 and an arbitrary constant is ωp, a gain constant Ki in the integrator and the two constants (a1, b1) are represented by formula (2) below.

$$Ki = \frac{J1 + J2}{J1} \cdot \omega p,$$
$$a1 = \frac{J1}{C1},$$
$$b1 = \frac{J1}{C1} + \frac{J2}{(J1 + J2) \cdot \omega p} \quad (2)$$

(4) Preferably, in this case, the test piece includes an engine (for example, an engine E to be described later), and when the engine is in an idle operation state, the dynamometer control device generates torque current command signal using the output signal of the phase lead compensator.

(5) A dynamometer control device (for example, a dynamometer control device 6A to be described later) of the present invention generates a torque current command signal (T2) for the inverter based on a shaft torque detection signal (T12) of the shaft torque meter, includes: an integrator (for example, a integrator 62A to be described later) which integrates a difference between the shaft torque detection signal and a command signal for the shaft torque; and a phase lag compensator (for example, a phase lag compensator 63A to be described later) which uses the shaft torque detection signal as an input and which performs phase lag compensation processing using one or more constants (for example, constants (a2, b2) to be described later) that depend on the viscous drag of the test piece and uses an output signal of the integrator and generates the torque current command signal using an output signal of the phase lag compensator.

(6) Preferably, in this case, a transfer function G2(s) of the phase lag compensator is represented by formula (3) below by use of two constants (a2, b2) which depend on the value of a viscous drag coefficient (C1) of the test piece, the value of moment of inertia (J1) of the test piece and the value of moment of inertia (J2) of the dynamometer;

$$G2(s) = \frac{b2 \cdot s + 1}{a2 \cdot s + 1} \quad (3)$$

where a2>b2.

(7) Preferably, in this case, when the viscous drag coefficient is C1, the moment of inertia of the test piece is J1, the moment of inertia of the dynamometer is J2 and an arbitrary constant is ωp, a gain constant in the integrator and the two constants (a2, b2) are represented by formula (4) below.

$$Ki = 2 \cdot \omega p, \quad a2 = \frac{J1}{C1}, \quad b2 = \frac{J1 - J2}{C1} \quad (4)$$

(8) Preferably, in this case, the test piece includes an engine, and when the engine is in an idle operation state, the dynamometer control device generates the torque current command signal using the output signals of the integrator and the phase lag compensator.

(9) Preferably, in this case, the gain constant (Ki) in the integrator and the constants ((a1, b1) or (a2, b2)) are set such that a real part of a pole of the transfer function of the shaft torque detection signal (T12) for torque (T1) produced in the test piece is negative.

Effects of the Invention (1) In the dynamometer control device of the present invention, the integrator which integrates a difference between the shaft torque detection signal and the command signal for the shaft torque is used to generate the torque current command signal, and thus the shaft torque detection signal can be made to follow the command signal. In addition, in the dynamometer control device of the present invention, the output signal of the phase lead compensator which uses the output signal of the integrator as the input and which performs the phase lead compensation processing using one or more constants that depend on the viscous drag of the test piece is used to generate the torque current command signal. In this way, for example, even when as described above, the rotation speed of the test piece is controlled in the low revolution range in which the viscous drag thereof remarkably appears, while the resonance in the low frequency region caused by the viscous drag of the test piece is being reduced, the shaft torque detection signal can be made to follow the command signal thereof. In this way, even in the low revolution region, it is possible to perform a highly accurate measurement.

(2) In the present invention, the transfer function G1(s) of the phase lead compensator is defined by formula (1) above by use of the two constants (a1, b1) which depend on the value of the viscous drag coefficient of the test piece, the value of the moment of inertia of the test piece and the value of the moment of inertia of the dynamometer, and thus the real parts of the poles of the transfer function of the shaft torque detection signal for torque produced in the test piece can be made negative. Hence, in the present invention, the phase lead compensator as described above is used to generate the torque current command signal, and thus it is possible to more reliably achieve the effect of reducing the resonance in the low frequency region caused by the viscous drag of the test piece.

(3) In the present invention, the gain constant in the integrator and the constants (a1, b1) in the phase lead compensator are represented by formula (2) above, and thus the real parts of the poles of the transfer function of the shaft torque detection signal for the torque produced in the test piece can be made negative, with the result that it is possible to more reliably achieve the effect of reducing the resonance in the low frequency region caused by the viscous drag of the test piece.

(4) As described above, in the idle operation state, the viscous drag of the engine becomes remarkable as compared with the other operation states. In the present invention, when the engine is in the idle operation state, the phase lead compensator having the function as described above is used to generate the torque current command signal, thus it is possible to reduce the resonance in the low frequency region caused by the viscous drag of the engine and hence the present invention is particularly effective.

(5) In the dynamometer control device of the present invention, the integrator which integrates a difference between the shaft torque detection signal and the command signal for the shaft torque is used to generate the torque current command signal, and thus the shaft torque detection signal can be made to follow the command signal. In addition, in the dynamometer control device of the present invention, the output signal of the phase lag compensator which uses the shaft torque detection signal as the input and which performs the phase lag compensation processing using one or more constants that depend on the viscous drag of the test piece is used to generate the torque current command signal. In this way, as in the invention of (1) above, while the resonance in the low frequency region caused by the viscous drag of the test piece is being reduced, the shaft torque detection signal can be made to follow the command signal thereof.

(6) The transfer function G2(s) of the phase lag compensator is defined by formula (3) above by use of the two constants (a2, b2) which depend on the value of the viscous drag coefficient of the test piece, the value of the moment of inertia of the test piece and the value of the moment of inertia of the dynamometer, and thus as in the invention of (2) above, the real parts of the poles of the transfer function of the shaft torque detection signal for the torque produced in the test piece can be made negative. Hence, in the present invention, the phase lag compensator as described above is used to generate the torque current command signal, and thus it is possible to more reliably achieve the effect of reducing the resonance in the low frequency region caused by the viscous drag of the test piece.

(7) In the present invention, the gain constant in the integrator and the constants (a2, b2) in the phase lag compensator are represented by formula (4) above, and thus the real parts of the poles of the transfer function of the shaft torque detection signal for the torque produced in the test piece can be made negative, with the result that it is possible to more reliably achieve the effect of reducing the resonance in the low frequency region caused by the viscous drag of the test piece.

(8) In the present invention, when the engine is in the idle operation state, the phase lag compensator having the function as described above is used to generate the torque current command signal, thus as in the invention of (3) above, it is possible to reduce the resonance in the low frequency region caused by the viscous drag of the engine and hence the present invention is particularly effective.

(9) In the present invention, the gain constant in the integrator and the constants included in the phase lead compensator or the phase lag compensator are set such that the real parts of the poles of the transfer function of the shaft torque detection signal for the torque produced in the test piece are negative. In this way, in the present invention, it is possible to more reliably achieve the effect of reducing the resonance in the low frequency region caused by the viscous drag of the test piece.

PREFERRED MODE FOR CARRYING OUT THE INVENTION

First Embodiment

Figure 1:
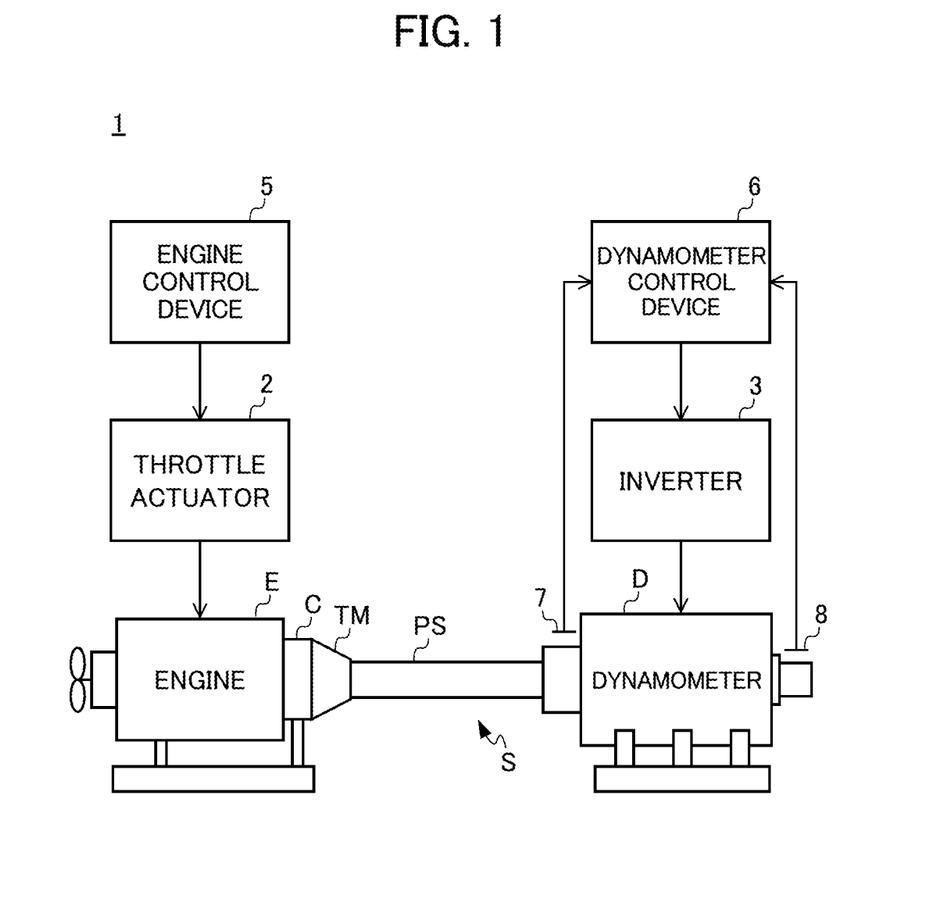
FIG. 1 is a diagram showing the configuration of a test system according to a first embodiment of the present invention.

A first embodiment of the present invention will be described in detail below with reference to drawings. FIG. 1 is a diagram showing the configuration of a test system 1 according to the present embodiment.

The test system 1 includes: an engine E which serves as a test piece that generates torque; a dynamometer D which is joined through a coupling shaft S to a crankshaft that is the output end of the engine E; an engine control device 5 which controls an output of the engine E through a throttle actuator 2; an inverter 3 which supplies electric power to the dynamometer D; a shaft torque meter 7 which detects a torsion torque (hereinafter referred to as a "shaft torque") that is produced in the coupling shaft S; and an encoder 8 which detects the rotation speed of an output shaft in the dynamometer D (hereinafter referred to as the "dynamo speed"). The test system 1 is a so-called engine bench system in which the engine E is a test target.

Although the coupling shaft S is configured by combining, for example, a clutch C, a transmission TM, a propeller shaft PS and the like, the present invention is not limited to this configuration. In the test system 1, while the throttle opening of the engine E is being controlled with the engine control device 5, the dynamometer control device 6 is used to absorb power generated in the engine E, and thus the durability, the fuel consumption, the exhaust purification performance and the like of the engine E are evaluated.

The engine control device 5 starts up the engine E with predetermined timing, and controls the output of the engine E through the throttle actuator 2 in a predetermined form.

The dynamometer control device 6 uses a shaft torque detection signal which is an output of the shaft torque meter 7, a shaft torque command signal which is a command signal for the shaft torque detection signal and an output signal of the encoder 8 so as to generate a torque current command signal, and inputs this signal to the inverter 3. The inverter 3 supplies electric power to the dynamometer D based on the torque current command signal generated in the dynamometer control device 6 so as to generate torque corresponding to the torque current command signal in the dynamometer D.

Here, a problem in a conventional test system and the cause thereof will be examined. In the following description, the conventional test system refers to a test system which uses the dynamometer control device disclosed in Japanese Unexamined Patent Application, Publication No. 2009-133714 by the applicant of the present application so as to control the shaft torque.

Figure 2:
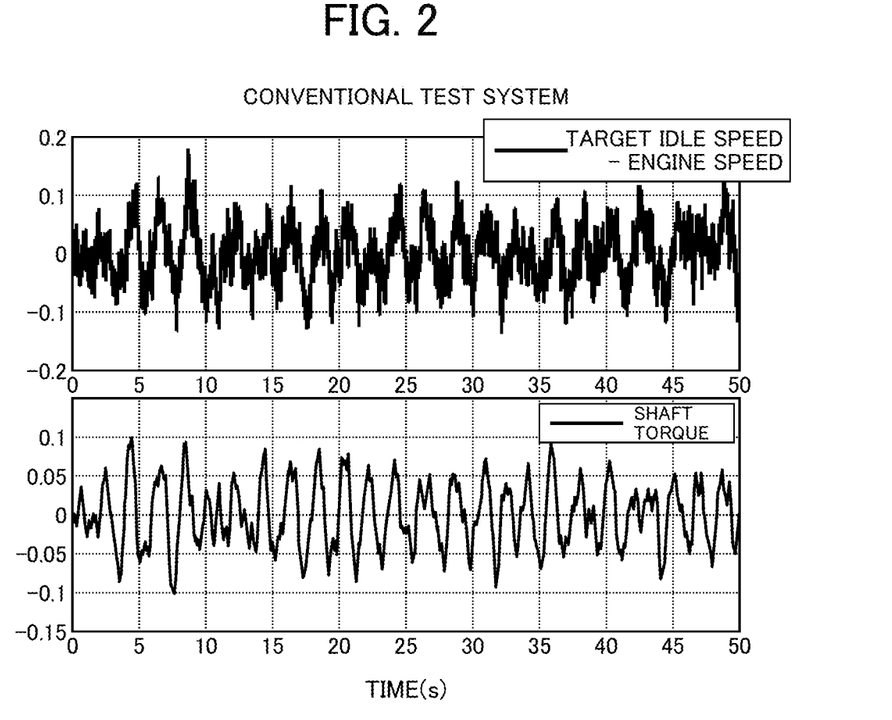
FIG. 2 is a diagram showing an example of the behavior of a deviation between the engine speed and a predetermined target idle speed and a shaft torque when in a conventional test system, the engine is controlled into an idle operation state.

FIG. 2 is a diagram showing an example of the behavior of a deviation (upper stage) between the engine speed and a predetermined target idle speed and the shaft torque (lower stage) when in the conventional test system, the engine is controlled into an idle operation state. More specifically, in the example of FIG. 2, while the control of the engine speed in which the engine speed is maintained at the predetermined target idle speed is being performed by the engine control device, the dynamometer control device disclosed in Japanese Unexamined Patent Application, Publication No. 2009-133714 is used to perform shaft torque control for changing the shaft torque to zero.

When as shown in FIG. 2, in the conventional test system, the engine is controlled into the idle operation state, lower frequency vibrations may be produced at a period of about 2 seconds both in the engine speed and the shaft torque. It is considered that the lower frequency vibrations are mainly caused by the viscous drag of the engine serving as the test piece. Specifically, although the dynamometer control device disclosed in Japanese Unexamined Patent Application, Publication No. 2009-133714 is configured based on an equation of motion in which a mechanical system is modeled such that the mechanical resonance of a frequency of about 10 Hz specific to the mechanical system formed by joining the engine and the dynamometer with the coupling shaft is reduced, in the equation of motion described above, the viscous drag of the engine is not considered. Since the viscous drag of the engine becomes more remarkable as the engine speed is lowered, the control of the number of revolutions of the engine in which the number of revolutions of the engine is maintained at the target idle speed and the control of the shaft torque by the dynamometer control device disclosed in Japanese Unexamined Patent Application, Publication No. 2009-133714 may interfere with each other, with the result that the lower frequency vibrations shown in FIG. 2 are considered to be produced.

Figure 3:
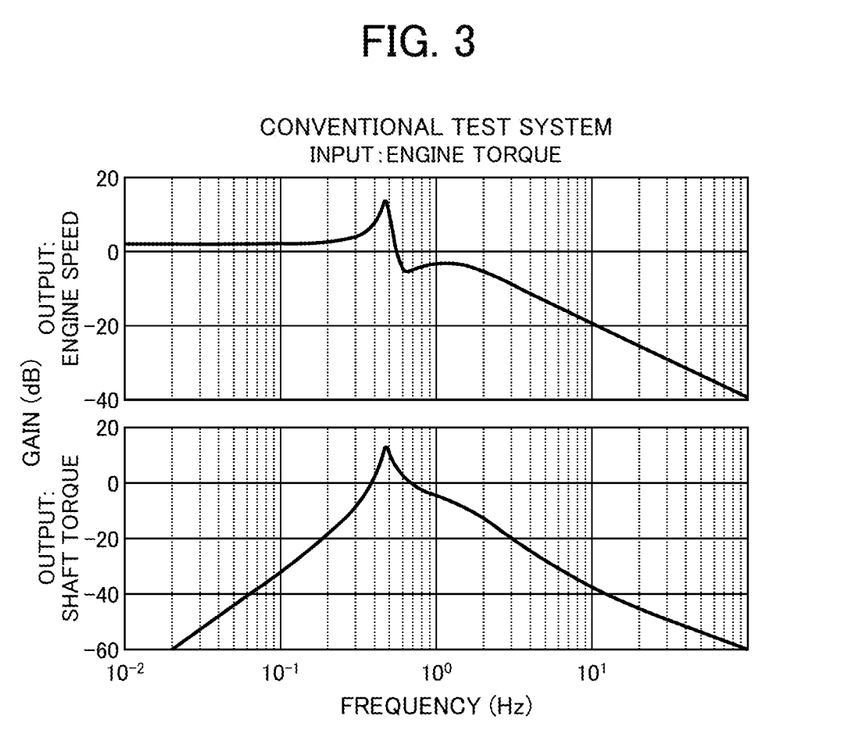
FIG. 3 is a diagram showing a gain characteristic of the engine speed for an engine torque and a gain characteristic of the shaft torque for the engine torque in the conventional test system.

FIG. 3 is a diagram showing a gain characteristic (upper stage) of the engine speed for an engine torque (more specifically, torque produced by the combustion pressure of the engine) and a gain characteristic (lower stage) of the shaft torque for the engine torque in the conventional test system.

As is clear from the gain characteristics of FIG. 3, in the conventional test system, a resonance characteristic is provided in the low frequency region of about 0.5 Hz lower than the mechanical resonance point of about 10 Hz described above. Hence, in the conventional test system, a small ripple of the engine torque is amplified, and thus the resonance phenomenon as shown in FIG. 2 occurs in the low frequency region of about 0.5 Hz.

The configuration of a control circuit in the dynamometer control device 6 according to the present embodiment which is configured so as to reduce resonance in a low frequency region caused by the viscous drag of the engine that may be produced in the conventional test system will be described below with reference to FIG. 4.

Figure 4:
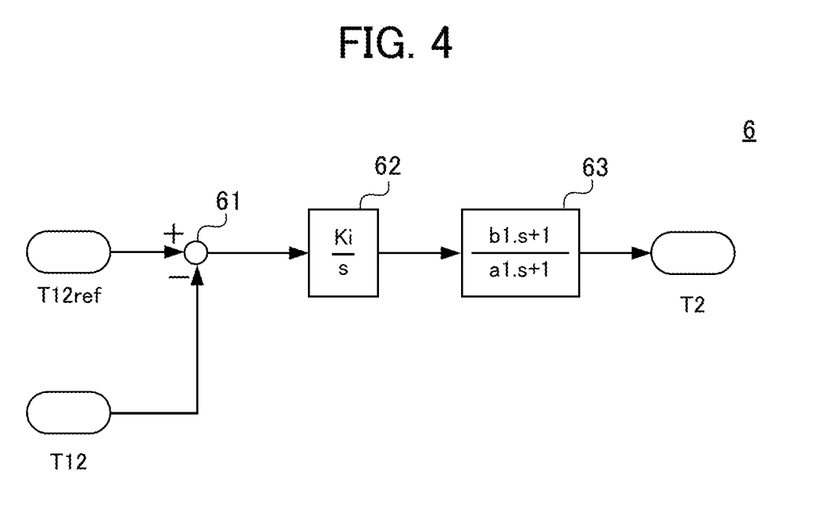
FIG. 4 is a block diagram showing the configuration of a control circuit in a dynamometer control device according to the embodiment.

FIG. 4 is a block diagram showing the configuration of the control circuit in the dynamometer control device 6. The dynamometer control device 6 includes a subtractor 61, an integrator 62 and a phase lead compensator 63. The subtractor 61 subtracts a shaft torque detection signal T12 [Nm] from a shaft torque command signal T12ref [Nm] so as to generate a shaft torque error signal, and inputs this signal to the integrator 62. The integrator 62 integrates the shaft torque error signal under a predetermined gain constant Ki so as to generate an integration error signal, and inputs this signal to the phase lead compensator 63.

The phase lead compensator 63 is a compensator which is inserted in order to reduce the resonance phenomenon that occurs in the shaft torque and the engine speed caused by the viscous drag of the engine, and for example, the transfer function G1(s) thereof is represented by formula (5) below which is defined by use of two constants (a1, b1) that depend on the viscous drag of the engine. Here, in formula (5) below, the constant b1 is larger than the constant a1 (b1>a1). The phase lead compensator 63 assumes, as a torque current command signal T2, a signal obtained by performing phase lead processing shown in formula (5) below on the integration error signal obtained by the integrator 62, and inputs this signal to the inverter.

$$G1(s) = \frac{b1 \cdot s + 1}{a1 \cdot s + 1} \quad (5)$$

In the dynamometer control device 6 configured as described above, the value of the gain constant Ki in the integrator 62 and the values of the two constants (a1, b1) in the phase lead compensator 63 are set such that the function of reducing the resonance in the low frequency region as described above is achieved and that all the real parts of the poles of the transfer function from an engine torque T1 to the shaft torque detection signal T12 are negative. More specifically, as the values of the gain constant Ki and the constants (a1, b1), for example, values are used which are calculated by formula (6) below that is defined by use of the value of a viscous drag coefficient C1 [Nms/rad] of the engine previously measured, the value of the moment of inertia J1 [kgm$^2$] of the engine, the value of the moment of inertia J2 [kgm$^2$] of the dynamometer and an arbitrary parameter ωp for determining a control response. In the present embodiment, the value of the parameter ωp is set to, for example, about 1 to 5.

$$Ki = \frac{J1 + J2}{J1} \cdot \omega p, \quad a1 = \frac{J1}{C1}, \quad b1 = \frac{J1}{C1} + \frac{J2}{(J1 + J2) \cdot \omega p} \quad (6)$$

The resonance reduction effect by the dynamometer control device 6 as described above will then be verified. First, with consideration given to the presence of the viscous drag of the engine represented by the viscous drag coefficient C1, equations of motion in the mechanical system configured by joining the engine and the dynamometer with the coupling shaft are represented by formulas (7-1), (7-2) and (7-3) below. In formulas (7-1) to (7-3) below, "w1" represents the angular velocity of the engine (hereinafter also referred to as the "engine speed") [rad/s], "T1" represents torque (hereinafter also referred to as the "engine torque") [Nm] generated in the engine, "T12" represents the shaft torque [Nm] generated in the coupling shaft, "T2" represents torque (hereinafter also referred to as a "dynamometer torque") [Nm] generated in the dynamometer, "K12" represents the shaft rigidity [Nm/rad] of the coupling shaft and "w2" represents the dynamo speed [rad/s].

$$J1 \cdot s \cdot w1 + C1 \cdot w1 = T1 + T12 \quad (7\text{-}1)$$

$$T12 = \frac{K12}{s} \cdot (w2 - w1) \quad (7\text{-}2)$$

$$J2 \cdot s \cdot w2 = -T12 + T2 \quad (7\text{-}3)$$

When the torque current command signal generated by the dynamometer control device 6 shown in FIG. 4 is assumed to be equal to a dynamometer torque T2, the dynamometer torque T2 is represented by formula (8) below.

$$T2 = \frac{b1 \cdot s + 1}{a1 \cdot s + 1} \cdot \frac{Ki}{s} \cdot (T12ref - T12) \quad (8)$$

Then, the transfer function of a shaft torque T12 for the engine torque T1 which can generate a torque ripple is represented by formula (9) below by use of formulas (7-1) to (7-3) and formula (8). When formula (9) below is derived, the value of the shaft torque command signal T12ref is set to zero, the shaft rigidity K12 is set to an infinite value and thus a term proportional to the reciprocal of the shaft rigidity K12 is set to zero. A limit obtained by setting the shaft rigidity K12 to an infinite value, that is, an assumption that the coupling shaft is a rigid member is reasonable with the assumption that the control response frequency in the control of the idle speed on the engine by the engine control device is sufficiently lower than the frequency of the mechanical resonance point of the mechanical system configured by joining the engine and the dynamometer with the coupling shaft. In formula (9) below, "D(s)" represents a characteristic polynomial.

$$\frac{T12}{T1} = \frac{-J2 \cdot s^2 \cdot (a1 \cdot s + 1)}{(J1 \cdot s + C1)\{(a1 \cdot s + 1)s + (b1 \cdot s + 1)Ki\} + J2 \cdot s^2 \cdot (a1 \cdot s + 1)} \quad (9)$$

$$\equiv \frac{-J2 \cdot s^2 \cdot (a1 \cdot s + 1)}{D(s)}$$

Here, when the gain constant Ki and the two constants (a1, b1) are defined as indicated by formula (6) above, the characteristic polynomial D(s) and the transfer function T12/T1 are represented by formulas (10-1) and (10-2) below. In other words, in the setting of parameters as indicated in formula (6) above, the dynamometer control device 6 shown in FIG. 4 can realize the non-oscillating stable control such that all the real parts of the poles of the transfer function T12/T1 are negative.

$$D(s) = \frac{J1 + J2}{J1} \cdot (C1 + J1 \cdot s) \cdot (s + \omega p) \cdot (a1 \cdot s + 1) \quad (10\text{-}1)$$

$$\frac{T12}{T1} = \frac{-J1 \cdot J2 \cdot s^2}{(J1 + J2) \cdot (C1 + J1 \cdot s) \cdot (s + \omega p)} \quad (10\text{-}2)$$

Figure 5:
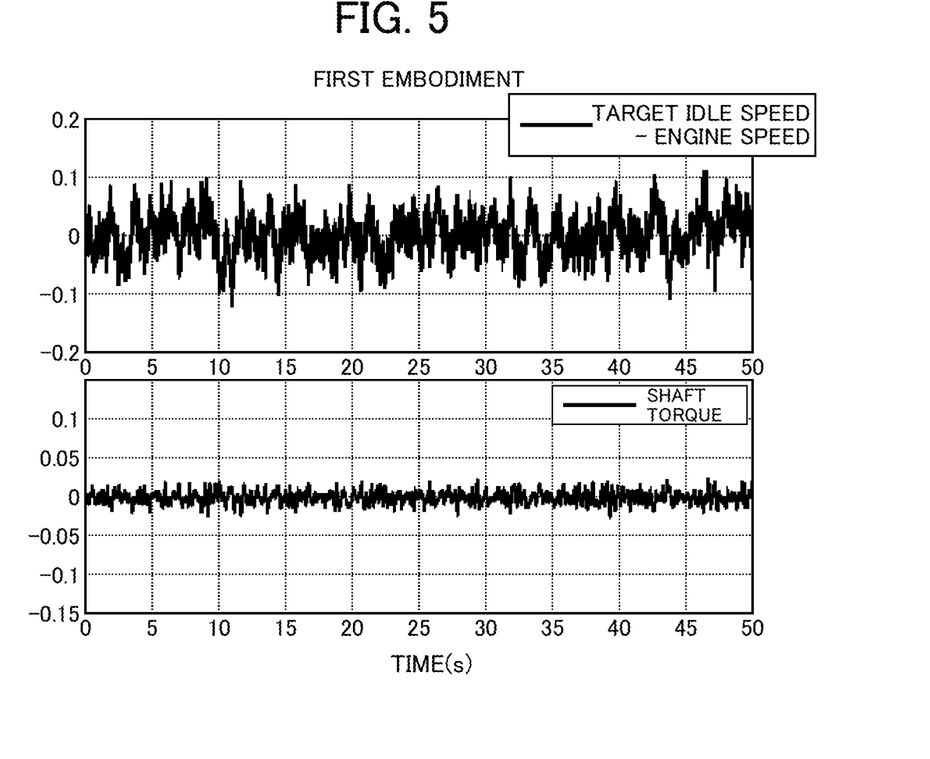
FIG. 5 is a diagram showing an example of the behavior of a deviation between the engine speed and a predetermined target idle speed and the shaft torque when in the idle operation state of the engine, the dynamometer control device according to the present embodiment is used to generate a torque current command signal.

The effect of the test system 1 according to the present embodiment will then be described. FIG. 5 is a diagram showing an example of the behavior of a deviation (upper stage) between the engine speed and a predetermined target idle speed and the shaft torque (lower stage) when in the idle operation state of the engine, the dynamometer control device 6 including the phase lead compensator 63 as described above is used to generate the torque current command signal. When the test result of FIG. 5 is obtained, the control of the engine speed is performed with the same things as those used for obtaining the result of FIG. 2, and as in FIG. 2, the value of the shaft torque command signal is set to zero.

As shown in FIG. 5, in the test system 1 according to the present embodiment, in the setting of parameters as indicated in formula (6), the phase lead compensator using the constants (a1, b1) which depend on the viscous drag of the engine as indicated in formula (5) is used to generate the torque current command signal, and thus the lower frequency vibrations of about 0.5 Hz caused by the viscous drag of the engine are significantly reduced as compared with the conventional test system of FIG. 2.

Figure 6:
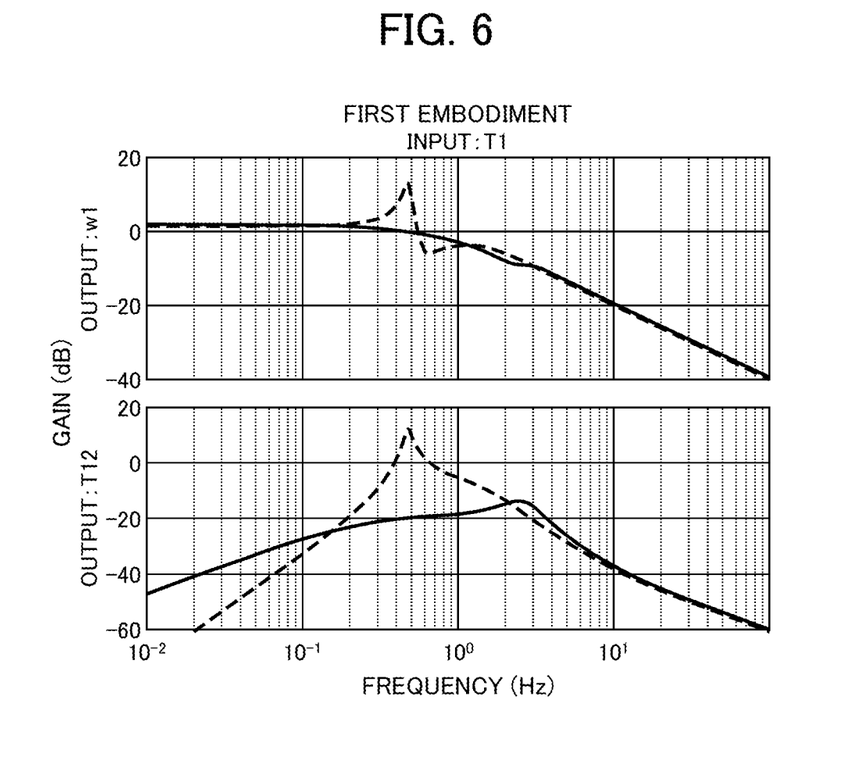
FIG. 6 is a diagram showing a gain characteristic of the engine speed for the engine torque and a gain characteristic of the shaft torque for the engine torque in the test system according to the embodiment.

FIG. 6 is a diagram showing a gain characteristic (upper stage) of the engine speed for the engine torque and a gain characteristic (lower stage) of the shaft torque for the engine torque in the test system 1 according to the present embodiment. In FIG. 6, for comparison, the gain characteristics in the conventional test system shown in FIG. 3 are represented by broken lines. As shown in FIG. 6, in the test system 1 according to the present embodiment, the resonance characteristic in the low frequency region of about 0.5 Hz provided in the conventional test system is removed. Hence, the small ripple of the engine torque in the low frequency region is prevented from being amplified, and thus the lower frequency vibrations are reduced as shown in FIG. 5, with the result that it is possible to perform a highly accurate measurement even in the low frequency region.

Second Embodiment

The first embodiment of the present invention will be described in detail below with reference to drawings.

Figure 7:
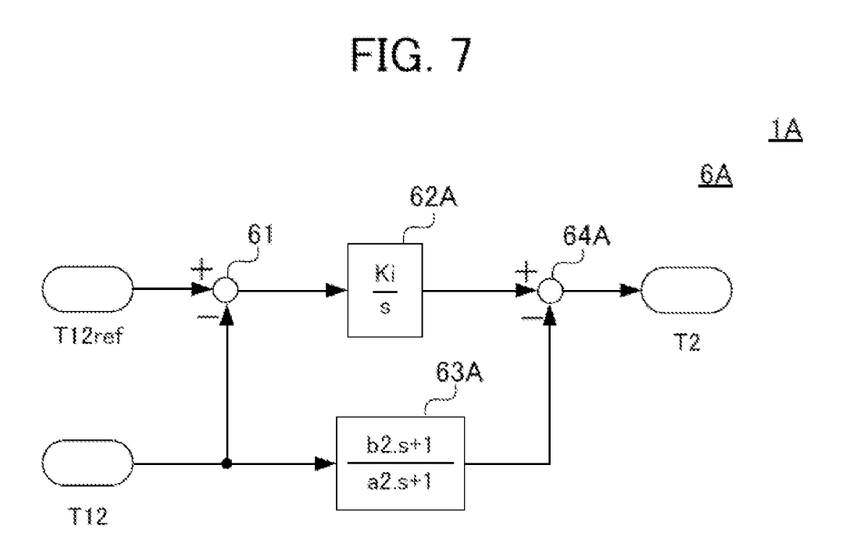
FIG. 7 is a block diagram showing the configuration of a control circuit in a dynamometer control device according to a second embodiment of the present invention.

FIG. 7 is a block diagram showing the configuration of a control circuit in a dynamometer control device 6A of a test system 1A according to the present embodiment. The test system 1A according to the present embodiment differs from the test system 1 of FIG. 1 according to the first embodiment in the configuration of the dynamometer control device, and they are the same in the other configurations. In the following discussion, the same configurations as in the first embodiment are identified with the same reference numerals, and the description thereof will be omitted.

The dynamometer control device 6A includes the subtractor 61, an integrator 62A, a phase lag compensator 63A and a subtractor 64A. The phase lag compensator 63A is a compensator which is inserted in order to reduce the resonance phenomenon that occurs in the shaft torque and the engine speed caused by the viscous drag of the engine, and for example, the transfer function G2(s) thereof is represented by formula (11) below which is defined by use of two constants (a2, b2) that depend on the viscous drag of the engine. Here, in formula (11) below, the constant a2 is larger than the constant b2 (a2>b2). The phase lag compensator 63A inputs, to the subtractor 64A, a compensation signal obtained by performing phase lag processing shown in formula (11) below on the shaft torque detection signal T12.

$$G2(s) = \frac{b2 \cdot s + 1}{a2 \cdot s + 1} \quad (11)$$

The subtractor 64A assumes, as the torque current command signal T2, a signal obtained by subtracting a compensation signal obtained by the phase lag compensator 63A from an integration error signal obtained by the integrator 62A, and inputs this signal to the inverter.

In the dynamometer control device 6A configured as described above, the value of the gain constant Ki in the integrator 62A and the values of the two constants (a2, b2) in the phase lag compensator 63A are set such that the function of reducing the resonance in the low frequency region described with reference to FIGS. 2 and 3 is achieved and that all the real parts of the poles of the transfer function from the engine torque T1 to the shaft torque detection signal T12 are negative. More specifically, as the values of the gain constant Ki and the constants (a2, b2), for example, values are used which are calculated by formula (12) below that is defined by use of the value of the viscous drag coefficient C1 of the engine, the value of the moment of inertia J1 of the engine, the value of the moment of inertia J2 of the dynamometer and the arbitrary parameter ωp for determining a control response. In the present embodiment, the value of the parameter ωp is set to, for example, about 10 to 50.

$$Ki = 2 \cdot \omega p, \quad a2 = \frac{J1}{C1}, \quad b2 = \frac{J1 - J2}{C1} \qquad (12)$$

The resonance reduction effect by the dynamometer control device 6A as described above will then be verified. First, in the dynamometer control device 6A shown in FIG. 7, the dynamometer torque T2 is represented by formula (13) below.

$$T2 = \frac{Ki}{s} \cdot (T12ref - T12) - \frac{b1 \cdot s + 1}{a1 \cdot s + 1} \cdot T12 \qquad (13)$$

Then, the gain constant Ki and the two constants (a2, b2) are defined as indicated in formula (12) above, and are further approximated by the same procedure as in the first embodiment, and thus formula (14) below on the transfer function T12/T1 of the shaft torque T12 for the engine torque T1 is derived. In other words, in the setting of parameters as indicated in formula (12) above, the dynamometer control device 6A shown in FIG. 7 can realize the non-oscillating stable control such that all the real parts of the poles of the transfer function T12/T1 are negative.

$$\frac{T12}{T1} = \frac{-J2 \cdot s^2}{2 \cdot (C1 + J1 \cdot s) \cdot (s + \omega p)} \qquad (14)$$

Figure 8:
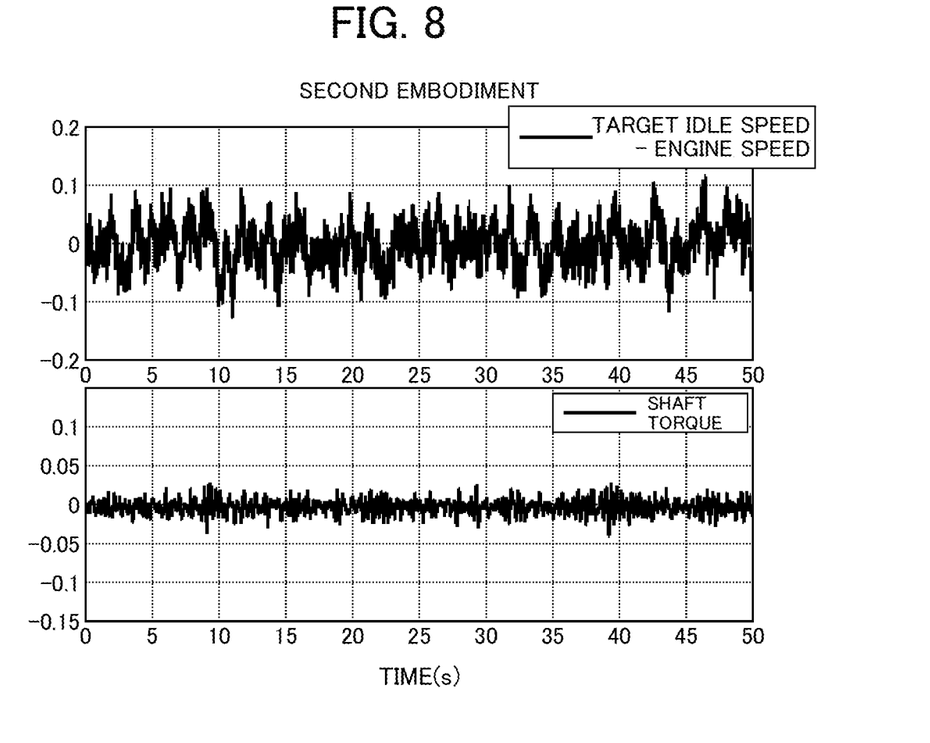
FIG. 8 is a diagram showing an example of the behavior of a deviation between the engine speed and a predetermined target idle speed and the shaft torque when in the idle operation state of the engine, the dynamometer control device according to the embodiment is used to generate a torque current command signal.

The effect of the test system 1A according to the present embodiment will then be described. FIG. 8 is a diagram showing an example of the behavior of a deviation (upper stage) between the engine speed and a predetermined target idle speed and the shaft torque (lower stage) when in the idle operation state of the engine, the dynamometer control device 6A including the phase lag compensator 63A as described above is used to generate the torque current command signal. When the test result of FIG. 8 is obtained, the control of the engine speed is performed with the same things as those used for obtaining the result of FIG. 2, and as in FIG. 2, the value of the shaft torque command signal is set to zero.

As shown in FIG. 8, in the test system 1A according to the present embodiment, in the setting of parameters as indicated in formula (12), the phase lag compensator using the constants (a2, b2) which depend on the viscous drag of the engine as indicated in formula (11) is used to generate the torque current command signal, and thus as in the test system 1 of the first embodiment, the lower frequency vibrations of about 0.5 Hz caused by the viscous drag of the engine are significantly reduced as compared with the conventional test system of FIG. 2.

Figure 9:
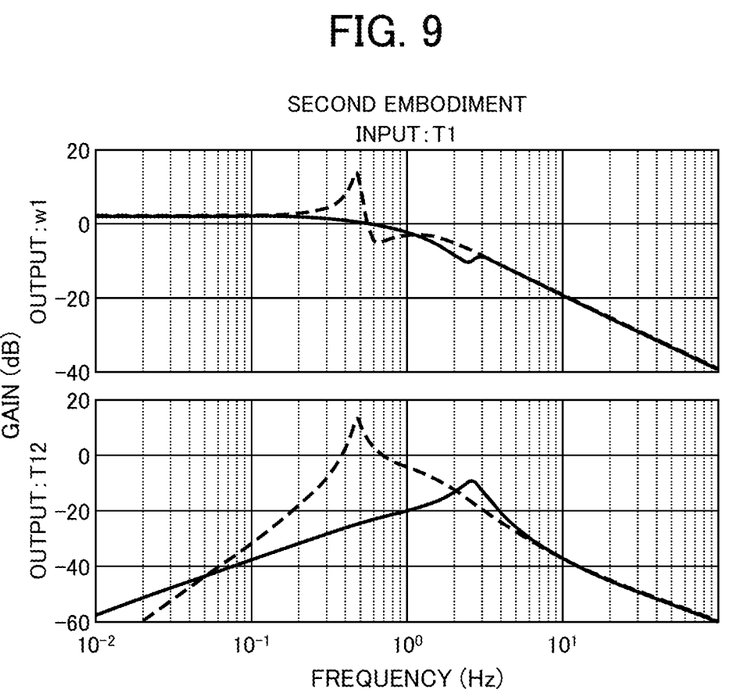
FIG. 9 is a diagram showing a gain characteristic of the engine speed for the engine torque and a gain characteristic of the shaft torque for the engine torque in the test system according to the embodiment.

FIG. 9 is a diagram showing a gain characteristic (upper stage) of the engine speed for the engine torque and a gain characteristic (lower stage) of the shaft torque for the engine torque in the test system 1A according to the present embodiment. In FIG. 9, for comparison, the gain characteristics in the conventional test system shown in FIG. 3 are represented by broken lines. As shown in FIG. 9, in the test system 1A according to the present embodiment, the resonance characteristic in the low frequency region of about 0.5 Hz provided in the conventional test system is removed. Hence, the small ripple of the engine torque in the low frequency region is prevented from being amplified, and thus the lower frequency vibrations are reduced as shown in FIG. 8, with the result that it is possible to perform a highly accurate measurement even in the low frequency region.

Although the embodiment of the present invention is described above, the present invention is not limited to the embodiment. The detailed configurations may be changed as necessary without departing from the spirit of the present invention.

EXPLANATION OF REFERENCE NUMERALS

1A: test system
3: inverter
6, 6A: dynamometer control device
62, 62A: integrator
63: phase lead compensator
63A: Phase lag compensator
7: shaft torque meter
E: engine (test piece)
S: coupling shaft
D: dynamometer

The invention claimed is:

1. A test system comprising:
a dynamometer which is joined to a test piece for generating torque through a coupling shaft;
an inverter which supplies electric power to the dynamometer;
a shaft torque meter which detects a shaft torque produced in the coupling shaft; and
a dynamometer control device generating a torque current command signal for the inverter based on a shaft torque detection signal of the shaft torque meter,
wherein the test piece includes an engine, and
wherein the dynamometer control device comprises: an integrator which generates an integration error signal by calculating an integral value of a difference between the shaft torque detection signal and a command signal for the shaft torque, and multiplying the integral value by a predetermined gain constant; and
a phase lead compensator which uses the integration error signal as an input and which performs phase lead compensation processing using one or more constants that depend on viscous drag of the engine and
when the engine is in an idle operation state, the dynamometer control device generates the torque current command signal using an output signal of the phase lead compensator.

2. The test system according to claim 1, wherein a transfer function G1(s) of the phase lead compensator is represented by formula (1) below by use of two constants (a1, b1) which depend on a value of a viscous drag coefficient of the test piece, a value of moment of inertia of the test piece and a value of moment of inertia of the dynamometer;

$$G1(s) = \frac{b1 \cdot s + 1}{a1 \cdot s + 1} \qquad (1)$$

where b1>a1.

3. The test system according to claim 2, wherein when the viscous drag coefficient is C1, the moment of inertia of the test piece is J1, the moment of inertia of the dynamometer is J2 and an arbitrary constant is ωp, the gain constant Ki in the integrator and the two constants (a1, b1) are represented by formula (2) below.

$$Ki = \frac{J1+J2}{J1} \cdot \omega p, \quad a1 = \frac{J1}{C1}, \quad b1 = \frac{J1}{C1} + \frac{J2}{(J1+J2) \cdot \omega p}. \tag{2}$$

4. The test system according to claim 1, wherein the gain constant in the integrator and the constants are set such that a real part of a pole of the transfer function of the shaft torque detection signal for torque produced in the test piece is negative.

* * * * *

UNITED STATES PATENT AND TRADEMARK OFFICE
CERTIFICATE OF CORRECTION

PATENT NO. : 11,313,761 B2
APPLICATION NO. : 16/096548
DATED : April 26, 2022
INVENTOR(S) : Takao Akiyama It is certified that error appears in the above-identified patent and that said Letters Patent is hereby corrected as shown below:

On the Title Page

Change item (73):
"(73) Assignee: MEDENSHA CORPORATION, Tokyo (JP)"
To:
-- (73) Assignee: MEIDENSHA CORPORATION, Tokyo (JP) --

Signed and Sealed this
Thirteenth Day of September, 2022

Katherine Kelly Vidal
*Director of the United States Patent and Trademark Office*